United States Patent [19]

Pluss

[11] Patent Number: 4,496,498
[45] Date of Patent: Jan. 29, 1985

[54] STATISTICAL PACKING

[75] Inventor: Raymond Pluss, Klein-Andelfingen, Switzerland

[73] Assignee: Sulzer Brothers Limited, Winterthur, Switzerland

[21] Appl. No.: 398,187

[22] Filed: Jul. 14, 1982

[30] Foreign Application Priority Data

Jul. 30, 1981 [CH] Switzerland ............... 4928/81

[51] Int. Cl.³ .................................. B01F 3/04
[52] U.S. Cl. ............................. 261/95; 55/233;
165/60; 261/DIG. 72; 428/597
[58] Field of Search ................. 261/94–98,
261/108, 112, 113, DIG. 72; 55/90, 233;
202/158; 210/150; 422/310; 29/157.3 D, 163.5
R; D23/3, 4; 165/166, 60; 366/336, 337;
428/176, 597, 181–185, 604

[56] References Cited

U.S. PATENT DOCUMENTS

| 3,266,787 | 8/1966 | Eckert | 261/DIG. 72 |
| 3,311,356 | 3/1967 | Eckert | 261/DIG. 72 |
| 3,506,248 | 4/1970 | Starbuck et al. | 261/DIG. 72 |
| 4,067,936 | 1/1978 | Ellis et al. | 261/DIG. 72 |
| 4,122,011 | 10/1978 | Strigle, Jr. | 261/DIG. 72 |
| 4,203,934 | 5/1980 | Leva | 261/DIG. 72 |

FOREIGN PATENT DOCUMENTS

| 853159 | 10/1952 | Fed. Rep. of Germany | 261/94 |
| 1945048 | 3/1971 | Fed. Rep. of Germany | 261/94 |
| 2722556 | 11/1978 | Fed. Rep. of Germany | 261/112 |
| 542902 | 8/1922 | France | 261/DIG. 72 |
| 1439745 | 6/1976 | United Kingdom | 261/DIG. 72 |

OTHER PUBLICATIONS

Norton; *HY-PAK; Bulletin HY-30;* Norton Co., Akron, Ohio 44309; 1975.

Primary Examiner—Richard L. Chiesa
Attorney, Agent, or Firm—Kenyon & Kenyon

[57] ABSTRACT

The random or statistical packing is of hexagonal cross-section and has rectangular tongues and apertures punched out of the walls. The tongues extend towards the longitudinal axis of the packing with the opposite tongues being coplanar. The planes of the tongues are substantially parallel to the sides of the packing so that crossing channels arise for the passage of a gas. The packing has substantially the effect of a regular packing such that a satisfactory lateral distribution of liquid and gas with a relatively low pressure drop is obtained.

9 Claims, 4 Drawing Figures

STATISTICAL PACKING

This invention relates to a statistical or random packing. More particularly, this invention relates to a statistical packing for packing columns for mass transfer and direct heat exchange.

As is known, random or statistical packings generally have a diameter which is equal to or greater than their height. In constructions in which the height and diameter are the same, for example in the case of Pall rings and Raschig rings, the packings have no preferred direction. That is, the fill of packings within a column is irregular and uncontrolled so far as the arrangement of the individual packings is concerned. Some are so arranged in columns that the longitudinal axis extends parallel to the column axis. In the case where the packing diameter is greater than the packing height, this arrangement is even more pronounced.

Fills of the above kind cause a relatively reduced pressure drop for a gas phase in a rectification process. However, a descending liquid mainly flows through the packings so that the superficial area available for mass transfer is relatively small. Further, there is no lateral distribution of either the liquid phase or gas phase over the column cross-section.

Accordingly, it is an object of the invention to provide a statistical packing which has an improved separating effect.

It is another object of the invention to provide a statistical packing which is able to effect a satisfactory lateral distribution of a gas phase and a liquid phase.

It is another object of the invention to provide a statistical packing which is simple to fabricate.

Briefly, the invention provides a statistical packing which has a peripheral wall defining a polygonal shape and a plurality of tongues which extend inwardly from the wall to define gaps in the wall. In addition, the packing has a length greater than a diameter thereof.

Of note, the term "polygonal" is used to define circular or multi-sided polygons, for example a hexagon.

The statistical or random packings may be of a length which is 1.5 times to twice the packing diameter. When the packings are filled into the column, for example for mass transfer, the packings come to a position such that their longitudinal axes will extend preferentially in a perpendicular relation to the column axis. Consequently, an arrangement similar to a regular packing can be achieved. Thus, a descending liquid phase may trickle diagonally downwards along the tongues and the remaining peripheral surfaces of the packing instead of dropping freely through the packing. In addition, the tongues and the remaining portions of the packing deflect a gas phase laterally so that the packing provides a satisfactory lateral gas distribution as well as a satisfactory lateral liquid distribution.

These and other objects and advantages of the invention will become more apparent from the following detailed description taken in conjunction with the accompanying drawings wherein.

Figure 1:
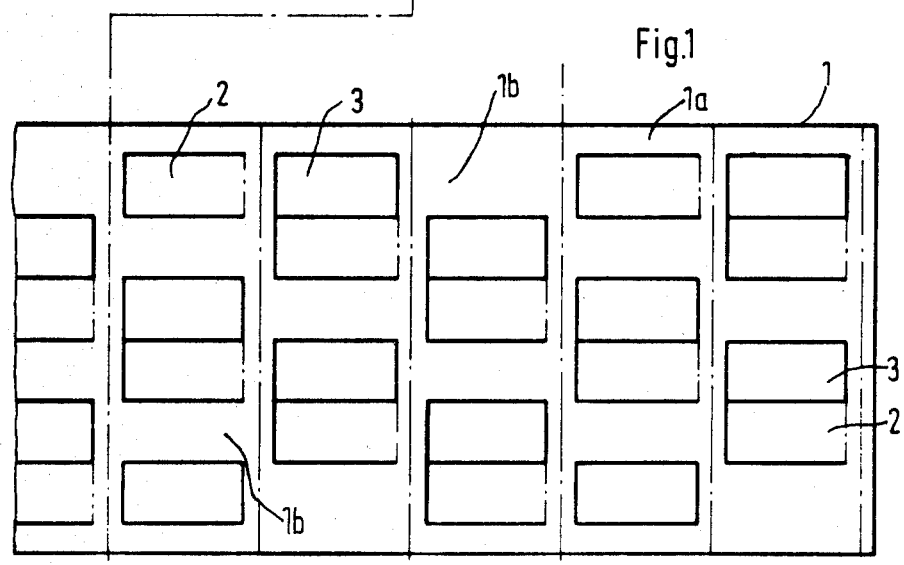
FIG. 1 illustrates a view of a statistical or random packing in accordance with the invention in developed form.

Referring to FIG. 1, the statistical or random packing 1 is made from a single piece of material, such as sheet metal, in a simple way by means of punching and bending operations. As indicated, the sheet metal strip has a plurality of adjacent sections 1a, 1b in which a plurality of tongues 2 and apertures 3 are punched. As shown, the tongues 2 and apertures 3 are each of rectangular shape. After punching, the tongues 2 are bent out of the plane of the sheet metal piece 1 to form gaps. The resulting skeletal framework is then severed and bent into a polygonal shape, for example a hexagonal shape as shown in FIG. 3.

Figure 3:
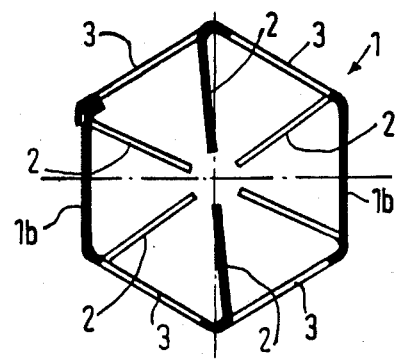
FIG. 3 illustrates a cross-sectional view taken on line II—II of FIG. 2 of the packing.

As indicated in FIG. 3, the packing has a peripheral wall having sides which are defined by the sections 1a, 1b while the tongues 2 extend inwardly from the wall toward the longitudinal axis of the packing.

Figure 2:
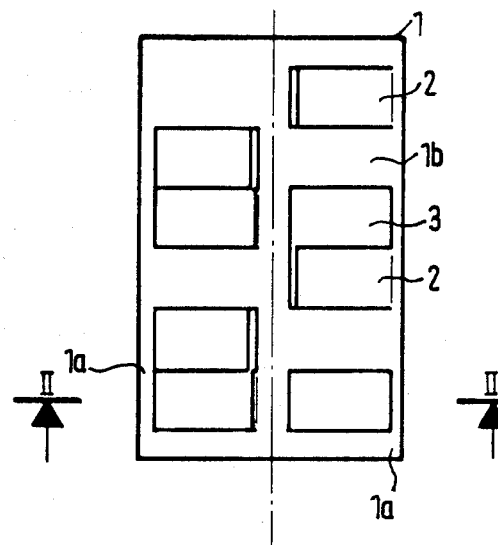
FIG. 2 illustrates a plan view of a packing according to the invention.

As indicated in FIGS. 2 and 3, the packing is sized so that the length is greater than the diameter. For example, the length is from 1.5 to twice the diameter of the packing.

Figure 4:
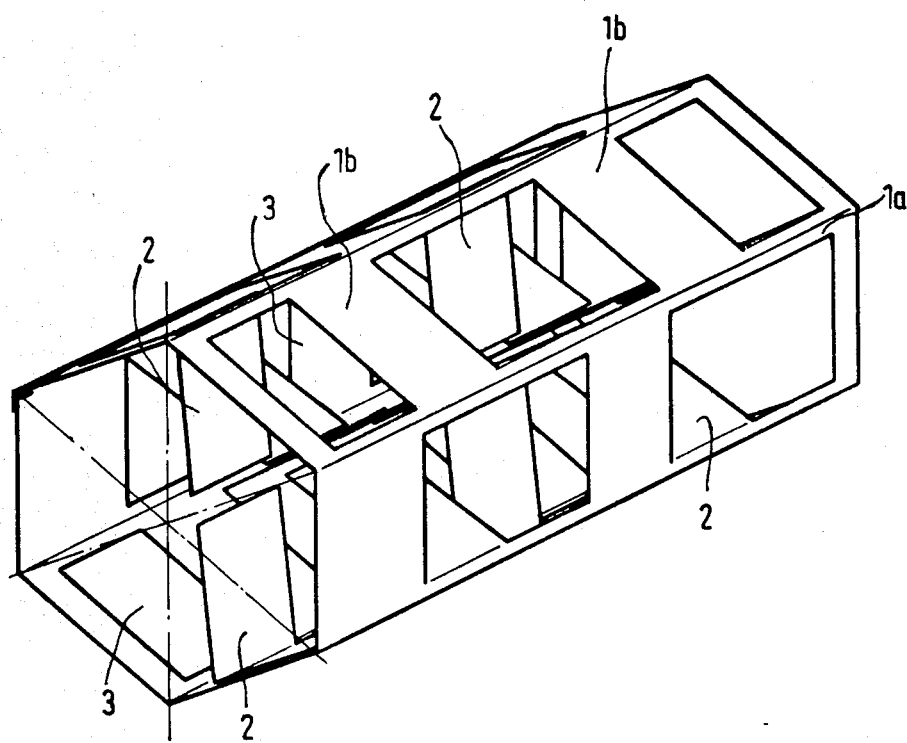
FIG. 4 illustrates a perspective view of the packing of FIGS. 2 and 3.

Referring to FIG. 3, the tongues 2 extend parallel to the longitudinal axis of the packing with the diametrically opposite tongues being coplanar. In addition, the packing is sized so as to have at least three pairs of tongues disposed consecutively along a longitudinal axis of the packing. Further, the adjacent pairs of tongues are circumferentially offset from each other, for example at an angle of 60°. As indicated in FIGS. 3 and 4, the adjacent tongues 2 are disposed in planes which include an angle sufficient to form a crossing channel for a flow of gas therebetween.

As indicated in FIG. 2, each side of the packing has a tongue 2, an aperture 3 and a solid surface portion vertically aligned therein as viewed.

When a plurality of packings are placed within a column (not shown), for example for mass transfer or heat exchange, the fill of the packings is such that the longitudinal axis of each packing extends perpendicularly to the column axis. Consequently, a downwardly flowing liquid is able to trickle downwardly along the tongues and the solid surface portions of the skeletal framework while an upwardly flowing gas is deflected laterally. As a result, a lateral liquid distribution and a lateral gas distribution is obtained.

Of note, the packing may be made of any suitable material and can be made in any suitable manner. For example, where the packing is made of plastics, the packing can be produced by injection molding. In order to improve liquid distribution and further to enhance the gas and liquid contact the peripheral surfaces and the tongues may be provided with apertures and/or fine fluting.

What is claimed is:

1. A statistical packing having a peripheral wall defining a polygonal shape, a plurality of tongues extending inwardly of said wall to define gaps in said wall, a plurality of apertures in said wall disposed circumferentially of said tongues and gaps, and solid surface portions disposed circumferentially of said tongues and apertures, said packing having a length greater than the diameter thereof.

2. A statistical packing as set forth in claim 1 wherein said tongues are disposed in staggered relation to each other longitudinally of said wall with diametrically disposed tongues being co-planar.

3. A statistical packing as set forth in claim 1 wherein said wall has a plurality of sides, each side having a tongue, an aperture and a solid surface portion aligned in the direction of the longitudinal axis of the packing.

4. A statistical packing as set forth in claim 3 wherein said tongues of adjacent walls are staggered relative to each other.

5. A statistical packing as set forth in claim 1 having a length of from 1.5 to 2 times greater than a diameter thereof.

6. A statistical packing as set forth in claim 1 wherein each said tongue extends parallel to and toward a longitudinal axis of said packing to form a channel for a flow of gas between a pair of adjacent tongues.

7. A statistical packing as set forth in claim 1 wherein adjacent tongues are circumferentially offset from each other at an angle of 60°.

8. A statistical packing as set forth in claim 1 wherein said surface portions and said tongues are provided with apertures.

9. A statistical packing as set forth in claim 1 wherein said surface portions and said tongues are provided with fine fluting.

* * * * *